United States Patent
Park

(10) Patent No.: US 10,963,775 B2
(45) Date of Patent: Mar. 30, 2021

(54) NEURAL NETWORK DEVICE AND METHOD OF OPERATING NEURAL NETWORK DEVICE

(71) Applicant: SAMSUNG ELECTRONICS CO., LTD., Suwon-si (KR)

(72) Inventor: Jun-Seok Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 919 days.

(21) Appl. No.: 15/657,950

(22) Filed: Jul. 24, 2017

(65) Prior Publication Data

US 2018/0089555 A1 Mar. 29, 2018

(30) Foreign Application Priority Data

Sep. 23, 2016 (KR) .................. 10-2016-0122471
Dec. 23, 2016 (KR) .................. 10-2016-0177466

(51) Int. Cl.
*G06N 3/08* (2006.01)
*G06N 3/04* (2006.01)
*G06K 9/46* (2006.01)
*G06N 3/063* (2006.01)

(52) U.S. Cl.
CPC ............ *G06N 3/04* (2013.01); *G06N 3/0454* (2013.01); *G06N 3/063* (2013.01)

(58) Field of Classification Search
CPC ......... G06N 3/04; G06N 3/063; G06N 3/0454
USPC ..................................... 706/1–62
See application file for complete search history.

(56) References Cited

U.S. PATENT DOCUMENTS

| | | | |
|---|---|---|---|
| 5,361,327 A * | 11/1994 | Takahashi | G06N 3/063 706/22 |
| 5,701,398 A * | 12/1997 | Glier | G06K 9/6273 706/41 |
| 5,805,733 A | 9/1998 | Wang et al. | |
| 7,346,208 B2 | 3/2008 | Staelin et al. | |
| 8,167,430 B2 | 5/2012 | Cobb et al. | |
| 9,007,197 B2 | 4/2015 | Breed | |
| 2014/0023343 A1 | 1/2014 | Harada et al. | |
| 2016/0171852 A1 | 6/2016 | Lin et al. | |
| 2016/0180195 A1 | 6/2016 | Martinson et al. | |
| 2016/0189009 A1 | 6/2016 | Tran et al. | |
| 2017/0103321 A1 * | 4/2017 | Henry | G06N 3/08 |
| 2017/0116495 A1 * | 4/2017 | Nomura | G06F 17/153 |
| 2017/0206405 A1 * | 7/2017 | Molchanov | G06K 9/00355 |

(Continued)

*Primary Examiner* — Brandon S Cole
(74) *Attorney, Agent, or Firm* — F. Chau & Associates, LLC

(57) ABSTRACT

In a method of operating a neural network device, a plurality of consecutive input data is received by an input layer. A delta data is generated by the input layer based on a difference between a current input data and a previous input data. A first current feature is generated by a first linear layer based on a first delta feature generated by performing a first linear operation on the delta data and a first previous feature. A second delta feature is generated by a first nonlinear layer based on a second current feature generated by performing a first nonlinear operation on the first current feature and a second previous feature. A third current feature is generated by a second linear layer based on a third delta feature generated by performing a second linear operation on the second delta feature and a third previous feature.

20 Claims, 10 Drawing Sheets

(56) References Cited

U.S. PATENT DOCUMENTS

2018/0089555 A1* 3/2018 Park .................. G06N 3/063
2019/0294413 A1* 9/2019 Vantrease ............ G06F 7/5443

* cited by examiner

NEURAL NETWORK DEVICE AND METHOD OF OPERATING NEURAL NETWORK DEVICE

CROSS-REFERENCE TO RELATED APPLICATIONS

This application claims priority under 35 U.S.C. § 119 to Korean Patent Application No. 10-2016-0122471, filed on Sep. 23, 2016, and Korean Patent Application No. 10-2016-0177466, filed on Dec. 23, 2016, the disclosures of which are incorporated by reference herein in their entireties.

TECHNICAL FIELD

Exemplary embodiments of the present inventive concept relate to a neural network device, and more particularly, to a method of increasing an operation speed of a neural network device.

DISCUSSION OF THE RELATED ART

A neural network, also referred to as an artificial neural network, refers to a system of hardware and/or software arranged in a pattern such that it operates similarly to the operation of neurons in the human brain. An artificial neural network may include a plurality of layers, each of which receives input data and generates output data by processing the input data.

As neural network technology advances, various kinds of electronic systems, such as a drone, an advanced drivers assistance system (ADAS), a robot, etc., may include a neural network device to extract useful information from input data.

SUMMARY

Exemplary embodiments of the present inventive concept provide a method of operating a neural network device that may increase an operation speed, and a neural network device that may increase an operation speed.

According to an exemplary embodiment of the present inventive concept, a method of operating a neural network device includes receiving, by an input layer, a plurality of consecutive input data. The neural network device includes a neural network including the input layer, a first linear layer, a first nonlinear layer, and a second nonlinear layer. The method further includes generating, by the input layer, a delta data based on a difference between a current input data and a previous input data from among the plurality of consecutive input data. The method further includes generating, by the first linear layer, a first current feature. The first current feature corresponds to a result of performing a first linear operation on the current input data based on a first delta feature and a first previous feature. The first delta feature is generated by performing the first linear operation on the delta data. The first previous feature is stored in a first register in the first linear layer. The method further includes generating, by the first nonlinear layer, a second delta feature based on a second current feature and a second previous feature. The second current feature is generated by performing a first nonlinear operation on the first current feature. The second previous feature is stored in a second register in the first nonlinear layer. The method further includes generating, by the second linear layer, a third current feature based on a third delta feature and a third previous feature. The third current feature corresponds to a result of performing a second linear operation on the second current feature. The third delta feature is generated by performing the second linear operation on the second delta feature. The third previous feature is stored in a third register in the second linear layer.

According to an exemplary embodiment of the present inventive concept, a neural network device includes an input layer of a neural network, a first linear layer of the neural network, a fast nonlinear layer of the neural network, and a second linear layer of the neural network. The input layer is configured to receive a plurality of consecutive input data, and generate a delta data based on a difference between a current input data and a previous input data from among the plurality of consecutive input data. The first linear layer is configured to generate a first delta feature by performing a first linear operation on the delta data, and generate a first current feature based on the first delta feature and a first previous feature. The first current feature corresponds to a result of performing the first linear operation on the current input data. The first previous feature is stored in a first register of the first linear layer. The first nonlinear layer is configured to generate a second current feature by performing a first nonlinear operation on the first current feature, and generate a second delta feature based on the second current feature and a second previous feature. The second previous feature is stored in a second register of the first nonlinear layer. The second linear layer is configured to generate a third delta feature by performing a second linear operation on the second delta feature, and generate a third current feature based on the third delta feature and a third previous feature. The third current feature corresponds to a result of performing the second linear operation on the second current feature. The third previous feature is stored in a third register of the second linear layer.

According to an exemplary embodiment of the present inventive concept, a method of recognizing an object in a video stream includes receiving a plurality of consecutive data frames included in the video stream using an input layer of a neural network, generating a delta data based on a difference between a current data frame and a previous data frame from among the plurality of consecutive data frames using the input layer of the neural network, and generating a first current feature using a first linear layer of the neural network. The first current feature corresponds to a result of performing a first linear operation on the current data frame based on a first delta feature and a first previous feature. The first delta feature is generated by performing the first linear operation on the delta data. The first previous feature is stored in a first register in the first linear layer. The method further includes generating a second delta feature based on a second current feature and a second previous feature using a first nonlinear layer of the neural network. The second current feature is generated by performing a first nonlinear operation on the first current feature. The second previous feature is stored in a second register in the first nonlinear layer. The method further includes generating a third current feature based on a third delta feature and a third previous feature using a second linear layer of the neural network. The third current feature corresponds to a result of performing a second linear operation on the second current feature. The third delta feature is generated by performing the second linear operation on the second delta feature. The third previous feature is stored in a third register in the second linear layer. The method further includes recognizing the object in the video stream using the third current feature.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
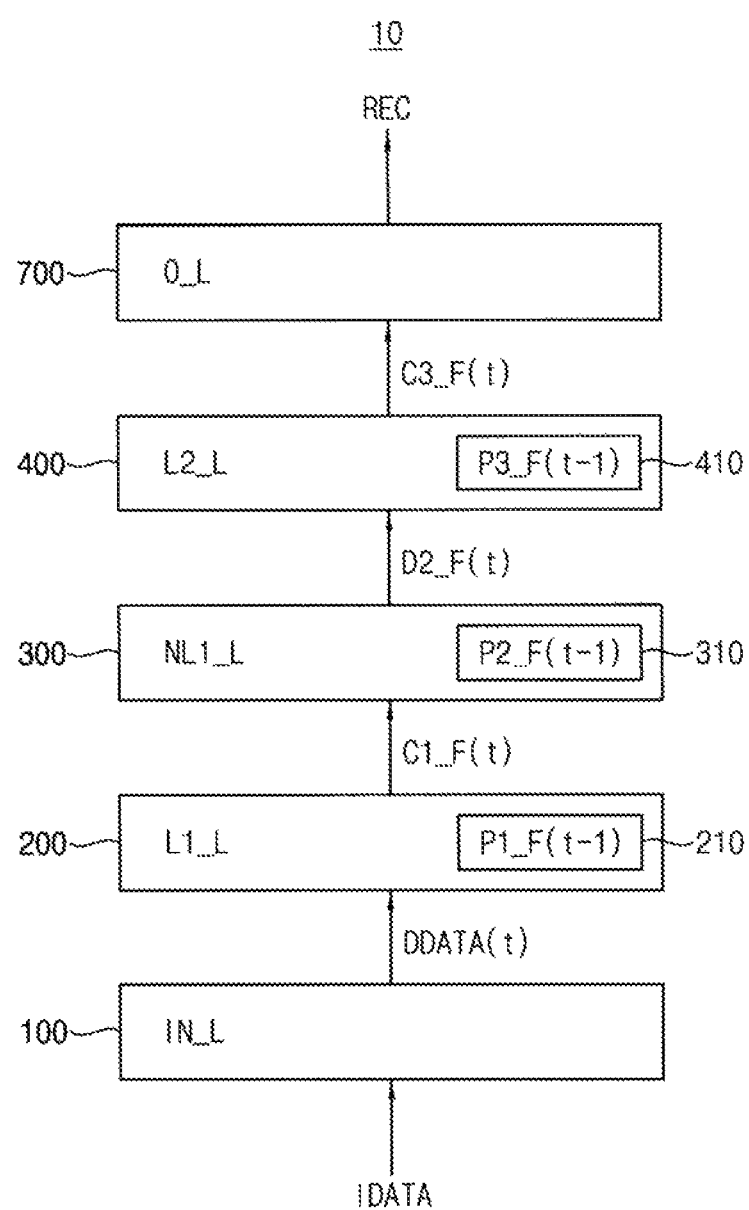
FIG. 1 is a block diagram illustrating a neural network device according to exemplary embodiments of the inventive concept.

Exemplary embodiments of the present inventive concept will be described more fully hereinafter with reference to the accompanying drawings. Like reference numerals may refer to like elements throughout the accompanying drawings.

FIG. 1 is a block diagram illustrating a neural network device according to exemplary embodiments of the inventive concept.

Referring to FIG. 1, a neural network device 10 includes an input layer IN_L 100, a first linear layer L1_L 200, a first nonlinear layer NL1_L 300, a second linear layer L2_L 400, and an output layer O_L 700. The input layer IN_L 100, the first linear layer L1_L 200, the first nonlinear layer NL1_L 300, the second linear layer L2_L 400, and the output layer O_L 700 may be sequentially connected to one another in the order shown in FIG. 1. Herein, a linear layer may refer to a layer that performs linear operations, and a nonlinear layer may refer to a layer that performs nonlinear operations.

The input layer 100 may receive a plurality of input data IDATA consecutively. When the input layer 100 is described as receiving a plurality of input data IDATA consecutively, the input layer 100 is receiving a plurality of consecutive input data IDATA in a sequential order. For example, when the input data IDATA corresponds to a video stream, the plurality of consecutive input data IDATA corresponds to a plurality of consecutive image frames that, when in a sequential order, form the video stream. In this case, the input layer 100 receives the plurality of consecutive input data IDATA in sequential order according to the video stream.

The input layer 100 may generate a delta data DDATA(t) based on a difference between a current input data IDATA(t) and a previous input data IDATA(t−1) when the input layer 100 receives each of the plurality of input data IDATA. For example, the input layer 100 may generate a delta data based on a difference between consecutive input data from among a plurality of input data.

After generating the delta data DDATA(t), the input layer 100 may provide the delta data DDATA(t) to the first linear layer 200. In exemplary embodiments, the input layer 100 may provide only the delta data DDATA(t) to the first linear layer 200 without providing the rest of the plurality of input data IDATA to the first linear layer 200. Here, t represents an integer equal to or greater than zero.

The first linear layer 200 may generate a first delta feature D1_F(t) by performing a first linear operation on the delta data DDATA(t), which is received from the input layer 100. The first linear layer 200 may further generate a first current feature C1_F(t), which corresponds to a result of performing the first linear operation on the current input data IDATA(t), based on the first delta feature D1_F(t) and a first previous feature P1_F(t−1), which is stored in a first register 210 of the first linear layer 200. The first linear layer 200 may provide the first current feature C1_F(t) to the first nonlinear layer 300.

In exemplary embodiments, the first linear layer 200 may correspond to a convolution layer of a neural network. Therefore, the first linear operation may include an addition operation and a multiplication operation performed on the delta data DDATA(t) and a first weight. In exemplary embodiments, the first weight may be predetermined.

The first nonlinear layer 300 may generate a second current feature C2_F(t) by performing a first nonlinear operation on the first current feature C1_F(t), which is received from the first linear layer 200. The first nonlinear layer 300 may further generate a second delta feature D2_F(t) based on the second current feature C2_F(t) and a second previous feature P2_F(t−1), which is stored in a second register 310 of the first nonlinear layer 300. The first nonlinear layer 300 may provide the second delta feature D2_F(t) to the second linear layer 400.

In exemplary embodiments, the first nonlinear layer 300 may correspond to one of an activation layer and a pooling layer of a neural network.

The second linear layer 400 may generate a third delta feature D3_F(t) by performing a second linear operation on the second delta feature D2_F(t), which is received from the first nonlinear layer 300. The second linear layer 400 my further generate a third current feature C3_F(t), which corresponds to a result of performing the second linear operation on the second current feature C2_F(t), based on the third delta feature D3_F(t) and a third previous feature P3_F(t−1), which is stored in a third register 410 of the second linear layer 400. The second linear layer 400 may provide the third current feature C3_F(t) to the output layer 700.

In exemplary embodiments, the second linear layer 400 may correspond to a fully connected layer of a neural network. Therefore, the second linear operation may include a matrix multiplication operation performed on the second delta feature D2_F(t) and a matrix corresponding to a second weight. In exemplary embodiments, the matrix corresponding to the second weight may be predetermined.

The output layer 700 may receive the third current feature C3_F(t) from the second linear layer 400.

As described above, since the third current feature C3_F(t) corresponds to a result of consecutively performing the first linear operation, the first nonlinear operation, and the second linear operation on the current input data IDATA(t), the third current feature C3_F(t) may implicitly include information included in the current input data IDATA(t).

Therefore, the output layer 700 may recognize the information included in the current input data IDATA(t) using the third current feature C3_F(t), which is received from the second linear layer 400, and generate a recognition signal REC corresponding to the recognized information.

In exemplary embodiments, the plurality of input data IDATA may correspond to a plurality of frame data included in a video stream. In this case, the output layer 700 may recognize/detect an object included in a frame data corresponding to the current input data IDATA(t) using the third current feature C3_F(t), which is received from the second linear layer 400, and generate the recognition signal REC corresponding to the recognized object.

Figure 2:
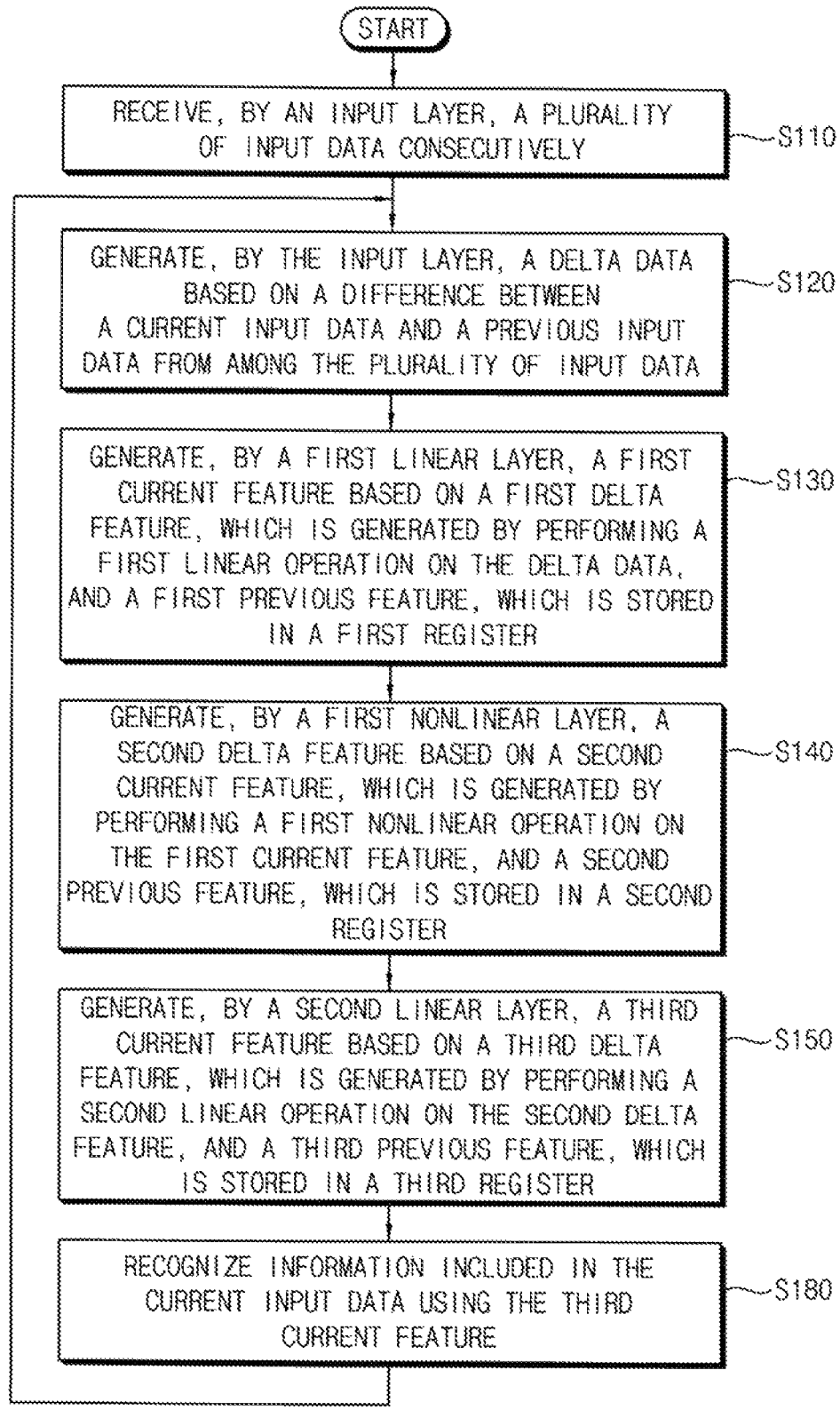
FIG. 2 is a flow chart illustrating a method of operating a neural network device according to exemplary embodiments of the inventive concept.

FIG. 2 is a flow chart illustrating a method of operating a neural network device according to exemplary embodiments of the inventive concept.

The method of operating a neural network device of FIG. 2 may be performed by the neural network device 10 of FIG. 1.

Hereinafter, a method of operating the neural network device 10 will be described with reference to FIGS. 1 and 2.

The input layer 100 may receive a plurality of input data IDATA consecutively (operation S110).

In exemplary embodiments, consecutive input data included in the plurality of input data IDATA may have a high degree of similarity. For example, the plurality of input data IDATA may correspond to a plurality of frame data included in a video stream. For example, consecutive frames included in a plurality of frame data of a video stream may have a high degree of similarity with respect to one another.

Hereinafter, the plurality of input data IDATA will be assumed to be a plurality of frame data included in a video stream. However, the present inventive concept is not limited thereto. For example, according to exemplary embodiments, the plurality of input data IDATA may be any type of data in which consecutive data has a high degree of similarity.

The input layer 100 may generate the delta data DDATA(t) based on a difference between the current input data IDATA(t) and the previous input data IDATA(t−1) when the input layer 100 receives each of the plurality of input data IDATA (operation S120).

For example, the input layer 100 may generate the delta data DDATA(t) by performing an operation of [Equation 1] when the input layer 100 receives each of the plurality of input data IDATA:

$$DDATA(t)=IDATA(t), \text{ (if, } t=0)$$

$$DDATA(t)=IDATA(t)-IDATA(t-1), \text{ (if, } t>0) \quad \text{[Equation 1]}$$

As represented in [Equation 1], the input layer 100 may determine a first input data IDATA(0) from among the plurality of input data IDATA as the delta data DDATA(t) (e.g., may set the first input data IDATA(0) as the delta data DDATA(t)) when the input layer 100 receives the first input data IDATA(0) as the current data IDATA(t), and generate the delta data DDATA(t) by subtracting the previous input data IDATA(t−1), which is previously received, from the current input data IDATA(t), which is currently received, when the input layer 100 receives each of the plurality of input data IDATA after receiving the first input data IDATA(0).

In exemplary embodiments, when the difference between the current input data IDATA(t) and the previous input data IDATA(t−1) is smaller than a threshold value, the input layer 100 may determine the delta data DDATA(t) as 0 (e.g., may set the delta data DDATA(t) to 0). Alternatively, when the difference between the current input data IDATA(t) and the previous input data IDATA(t−1) is equal to or greater than the threshold value, the input layer 100 may determine the difference between the current input data IDATA(t) and the previous input data IDATA(t−1) as the delta data DDATA(t) (e.g., may set the delta data DDATA(t) to the difference between the current input data IDATA(t) and the previous input data IDATA(t−1)).

Although [Equation 1] illustrates that the delta data DDATA(t) is generated by subtracting the previous input data IDATA(t−1) from the current input data IDATA(t), the present inventive concept is not limited thereto. For example, according to exemplary embodiments, the input layer 100 may generate the delta data DDATA(t) by subtracting a previous input data IDATA(t−a), which is received more than two cycles before the current input data IDATA(t), from the current input data IDATA(t). Here, a represents an integer equal to or greater than two.

For example, in an exemplary embodiment, the input layer 100 may generate the delta data DDATA(t) by subtracting a previous input data IDATA(t−2), which is received two cycles before the current input data IDATA(t), from the current input data IDATA(t), or generate the delta data DDATA(t) by subtracting a previous input data IDATA(t−3), which is received three cycles before the current input data IDATA(t), from the current input data IDATA(t).

When the plurality of input data IDATA corresponds to a plurality of frame data included in a video stream, the current input data IDATA(t) and the previous input data IDATA(t−1) may have a high degree of similarity. Therefore, most of the values included in the delta data DDATA(t) may be 0.

The input layer 100 may provide only the delta data DDATA(t) to the first linear layer 200 without providing the rest of the plurality of input data IDATA to the first linear layer 200.

The first linear layer 200 may generate the first delta feature D1_F(t) by performing the first linear operation on the delta data DDATA(t), which is received from the input layer 100. The first linear layer 200 may further generate the first current feature C1_F(t), which corresponds to a result of performing the first linear operation on the current input data IDATA(t), based on the first delta feature D1_F(t) and the first previous feature P1_F(t−1), which is stored in the first register 210 of the first linear layer 200 (operation S130).

The first previous feature P1_F(t−1), which is stored in the first register 210 of the first linear layer 200, may correspond to a result of performing the first linear operation on the previous input data IDATA(t−1).

Figure 3:
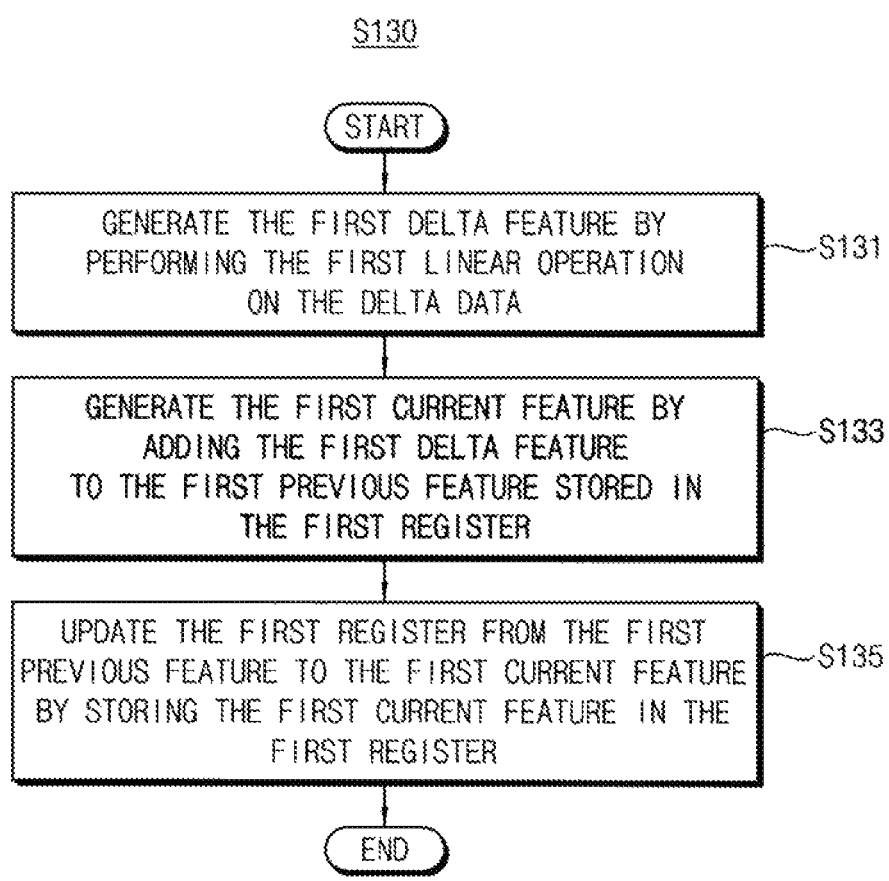
FIG. 3 is a flow chart illustrating an example of a process in which a first linear layer generates a first current feature of FIG. 2 according to exemplary embodiments of the inventive concept.

FIG. 3 is a flow chart illustrating an example of a process in which a first linear layer generates a first current feature of FIG. 2 according to an exemplary embodiment of the inventive concept. The operations illustrated in the flow chart of FIG. 3 correspond to operation S130 in the flow chart of FIG. 2 according to an exemplary embodiment of the inventive concept.

Referring to FIG. 3, the first linear layer 200 may generate the first delta feature D1_F(t) by performing the first linear operation on the delta data DDATA(t), which is received from the input layer 100 (operation S131).

In exemplary embodiments, the first linear layer 200 may correspond to a convolution layer of a neural network. In this case, the first linear operation may include a convolution operation using the first weight. Therefore, the first linear layer 200 may generate the first delta feature D1_F(t) by performing an operation of [Equation 2]:

$$D1\_F(t) = DDATA(t) * k \quad \text{[Equation 2]}$$

Here, * represents a convolution operation, and k represents the first weight used in the convolution operation.

Figure 4:
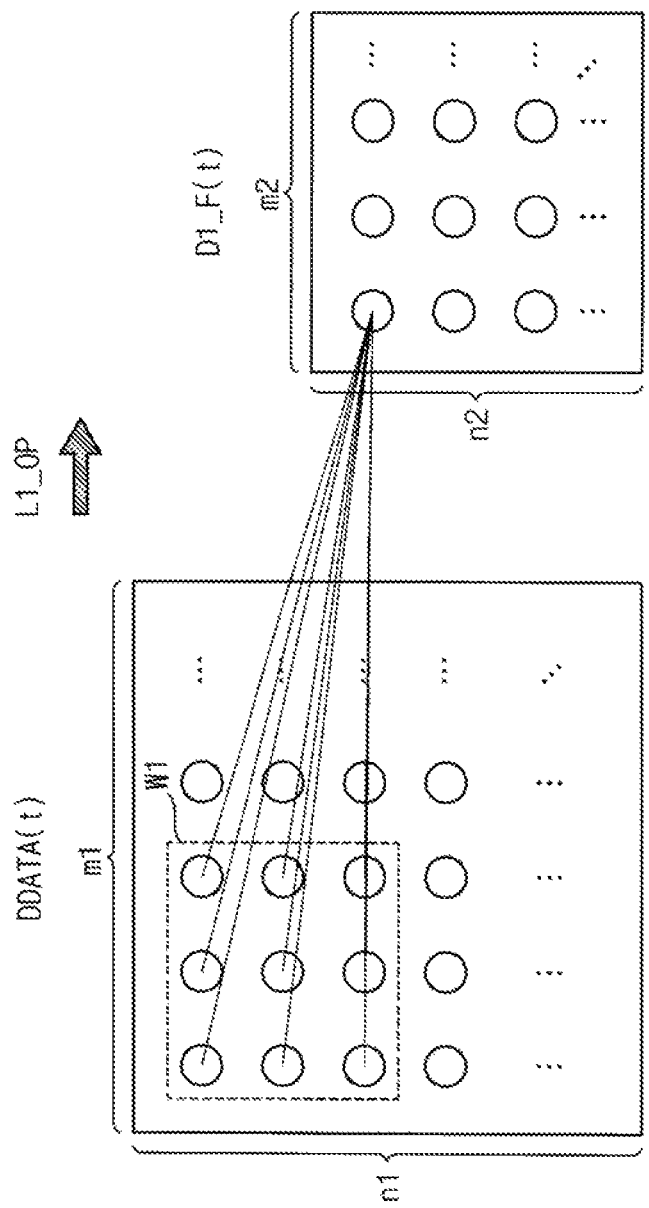
FIG. 4 is a diagram illustrating an example of a process in which the first linear layer generates a first delta feature by performing a first linear operation on a delta data of FIG. 3 according to exemplary embodiments of the inventive concept.

FIG. 4 is a diagram illustrating an example of a process in which the first linear layer generates a first delta feature by performing a first linear operation on a delta data of FIG. 3 according to an exemplary embodiment of the inventive concept.

In FIG. 4, the delta data DDATA(t) has (n1×m1) values, and the first delta feature D1_F(t) has (n2×m2) values as an example. Here, each of n1, m1, n2, and m2 represents a positive integer.

As illustrated in FIG. 4, the first linear layer 200 may set a first window W1 in the delta data DDATA(t), and perform the first linear operation L1_OP on values included in the first window W1 using the first weight to generate one value of the first delta feature D1_F(t). In this way, the first linear layer 200 may generate values of the first delta feature D1_F(t) by performing the first linear operation L1_OP on values included in the first window W1 using the first weight while moving the first window W1 in the delta data DDATA(t).

However, it is to be understood that the first linear operation L1_OP illustrated in FIG. 4 exemplary, and that the inventive concept is not limited thereto. For example, according to exemplary embodiments, the first linear operation L1_OP may include any linear operations (e.g., linear operations other than the linear operation L1_OP illustrated in FIG. 4).

Referring again to FIG. 3, since the first linear operation L1_OP includes an addition and a multiplication operation performed on the delta data DDATA(t) and the first weight, the first linear operation L1_OP may satisfy a commutative law, a distributive law, and an associative law.

Therefore, as represented in [Equation 3], the first current feature C1_F(t), which corresponds to a result of performing the first linear operation L1_OP on the current input data IDATA(t), may be represented as a sum of the first previous feature P1_F(t−1), which is stored in the first register 210 of the first linear layer 200 and corresponds to a result of performing the first linear operation L1_OP on the previous input data IDATA(t−1), and the first delta feature D1_F(t), which is generated by performing the first linear operation L1_OP on the delta data DDATA(t):

$$\begin{aligned} C1\_F(t) &= IDATA(t) * k \quad \text{[Equation 3]}\\ &= (IDATA(t-1) + DDATA(t)) * k \\ &= IDATA(t-1) * k + DDATA(t) * k \\ &= P1\_F(t-1) + D1\_F(t) \end{aligned}$$

Therefore, the first linear layer 200 may generate the first current feature C1_F(t) by adding the first delta feature D1_F(t) to the first previous feature P1_F(t−1), which is stored in the first register 210 of the first linear layer 200 (operation S133).

In addition, the first linear layer 200 may update the first register 210 from the first previous feature P1_F(t−1) to the first current feature C1_F(t) by storing the first current feature C1_F(t) in the first register 210 (operation S135). For example, the first linear layer 200 may update the first register 210 by replacing the first previous feature P1_F(t−1) with the first current feature C1_F(t).

As described above with reference to FIGS. 3 and 4, in exemplary embodiments, the first linear layer 200 does not generate the first current feature C1_F(t) by directly performing the first linear operation L1_OP on the current input data IDATA(t). Instead, in exemplary embodiments, the first linear layer 200 generates the first current feature C1_F(t) in a recursive manner, in which the first linear layer 200 generates the first delta feature D1_F(t) by performing the first linear operation L1_OP on the delta data DDATA(t) and then adding the first delta feature D1_F(t) to the first previous feature P1_F(t−1).

As described above, when the plurality of input data IDATA correspond to a plurality of frame data included in a video stream, the current input data IDATA(t) and the previous input data IDATA(t−1) may have a high degree of similarity. Therefore, most of the values included in the delta data DDATA(t) may be 0. As a result, the first linear layer 200 may perform the first linear operation L1_OP on the delta data DDATA(t) at a high speed. Therefore, the first linear layer 200 may generate the first current feature C1_F(t), which corresponds to a result of performing the first linear operation L1_OP on the current input data IDATA(t), at a high speed.

Once the first current feature C1_F(t) has been generated by the first linear layer 200, the first linear layer 200 may provide only the first current feature C1_F(t) to the first nonlinear layer 300.

Referring again to FIG. 2, the first nonlinear layer 300 may generate the second current feature C2_F(t) by performing the first nonlinear operation on the first current feature C1_F(t), which is received from the first linear layer 200. The first nonlinear layer 300 may further generate the second delta feature D2_F(t) based on the second current feature C2_F(t) and the second previous feature P2_F(t−1), which is stored in the second register 310 of the first nonlinear layer 300 (operation S140).

The second previous feature P2_F(t−1), which is stored in the second register 310 of the first nonlinear layer 300, may correspond to a result of performing the first nonlinear operation on a feature provided to the first nonlinear layer 300 from the first linear layer 200 during a previous cycle.

Figure 5:
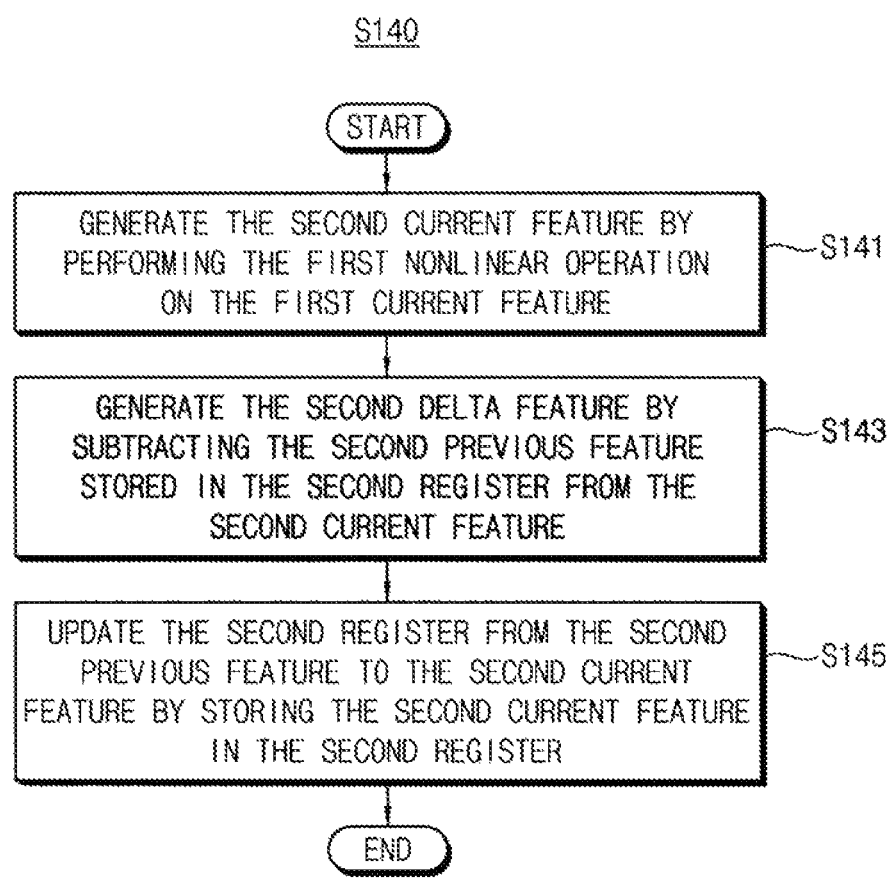
FIG. 5 is a flow chart illustrating an example of a process in which a first nonlinear layer generates a second delta feature of FIG. 2 according to exemplary embodiments of the inventive concept.

FIG. 5 is a flow chart illustrating an example of a process in which a first nonlinear layer generates a second delta feature of FIG. 2 according to an exemplary embodiment of the inventive concept. The operations illustrated in the flow chart of FIG. 5 correspond to operation S140 in the flow chart of FIG. 2 according to an exemplary embodiment of the inventive concept.

Referring to FIG. 5, the first nonlinear layer 300 may generate the second current feature C2_F(t) by performing the first nonlinear operation on the first current feature C1_F(t), which is received from the first linear layer 200 (operation S141).

In exemplary embodiments, the first nonlinear layer 300 may correspond to one of an activation layer and a pooling layer of a neural network.

Figure 6:
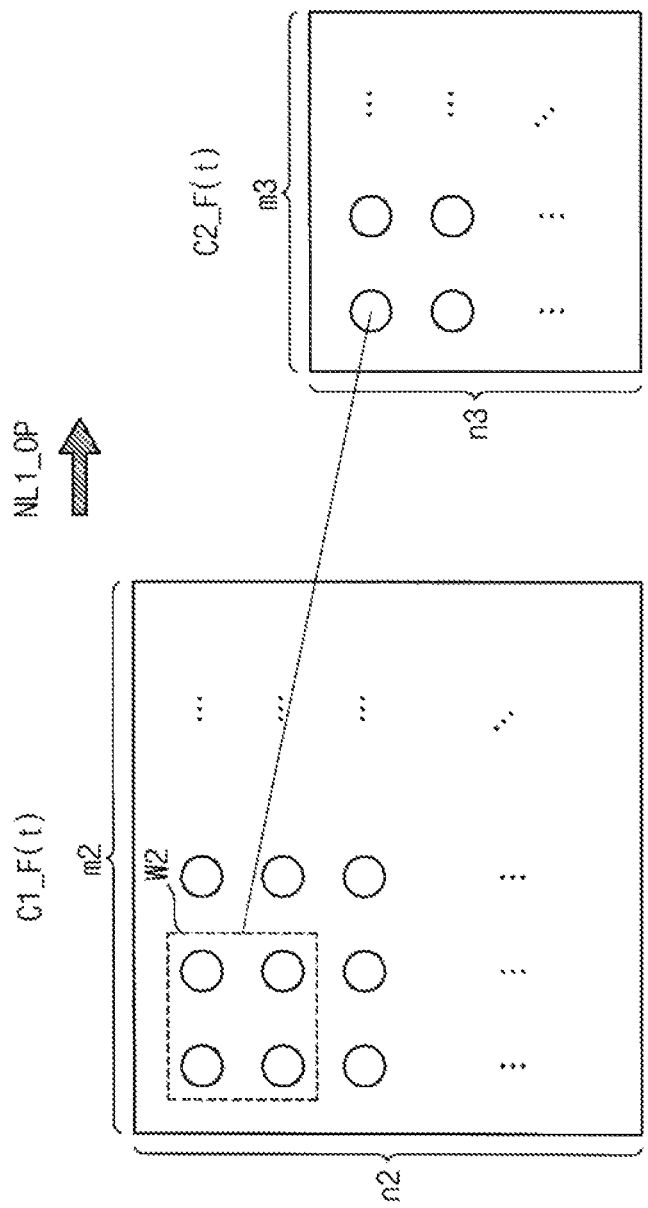
FIG. 6 is a diagram illustrating an example of a process in which the first nonlinear layer generates a second current feature by performing a first nonlinear operation on a first current data of FIG. 5 according to exemplary embodiments of the inventive concept.

FIG. 6 is a diagram illustrating an example of a process in which the first nonlinear layer generates a second current feature by performing a first nonlinear operation on a first current data of FIG. 5 according to an exemplary embodiment of the inventive concept.

In FIG. 6, the first current feature C1_F(t) has (n2×m2) values, and the second current feature C2_F(t) has (n3×m3) values as an example. Here, each of n3 and m3 represents a positive integer.

As illustrated in FIG. 6, the first nonlinear layer 300 may set a second window W2 in the first current feature C1_F(t), and determine a maximum value from among values included in the second window W2 as one value of the second current feature C2_F(t). In this way, the first nonlinear layer 300 may perform the first nonlinear operation NL1_OP on the first current feature C1_F(t) to generate values of the second current feature C2_F(t) by determining a maximum value from among values included in the second window W2 as one value of the second current feature C2_F(t) while moving the second window W2 in the first current feature C1_F(t).

As described above with reference to FIG. 6, in exemplary embodiments, since the first nonlinear operation NL1_OP does not include an addition and a multiplication operation performed on values of the first current feature C1_F(t) and a weight, the first nonlinear layer 300 may perform the first nonlinear operation NL1_OP at a high speed.

However, it is to be understood that the first nonlinear operation NL1_OP illustrated in FIG. 6 is exemplary, and that the inventive concept is not limited thereto. For example, according to exemplary embodiments, the first nonlinear operation NL1_OP may include any nonlinear operations (e.g., nonlinear operations other than the nonlinear operation NL1_OP illustrated in FIG. 6).

Referring again to FIG. 5, as represented in [Equation 4], the first nonlinear layer 300 may generate the second delta feature D2_F(t) by subtracting the second previous feature P2_F(t−1), which is stored in the second register 310 of the first nonlinear layer 300, from the second current feature C2_F(t) (operation S143):

$$D2\_F(t)=C2\_F(t)-P2\_F(t-1)$$ [Equation 4]

In addition, the first nonlinear layer 300 may update the second register 310 from the second previous feature P2_F(t−1) to the second current feature C2_F(t) by storing the second current feature C2_F(t) in the second register 310 (operation S145). For example, the first nonlinear layer 300 may update the second register 310 by replacing the second previous feature P2_F(t−1) with the second current feature C2_F(t).

The first nonlinear layer 300 may provide only the second delta feature D2_F(t) to the second linear layer 400.

As described above, when the plurality of input data IDATA corresponds to a plurality of frame data included in a video stream, the current input data IDATA(t) and the previous input data IDATA(t−1) may have a high degree of similarity. Therefore, most of the values included in the second delta feature D2_F(t), which corresponds to a difference between the second current feature C2_F(t) and the second previous feature P2_F(t−1), may be 0.

Referring again to FIG. 2, the second linear layer 400 may generate the third delta feature D3_F(t) by performing the second linear operation on the second delta feature D2_F(t), which is received from the first nonlinear layer 300. The second linear layer 400 may further generate the third current feature C3_F(t), which corresponds to a result of performing the second linear operation on the second current feature C2_F(t), based on the third delta feature D3_F(t) and the third previous feature P3_F(t−1), which is stored in the third register 410 of the second linear layer 400 (operation S150).

Here, the third previous feature P3_F(t−1), which is stored in the third register 410 of the second linear layer 400, may correspond to a result of performing the second linear operation on the second previous feature P2_F(t−1), which is stored in the second register 310 of the first nonlinear layer 300.

Figure 7:
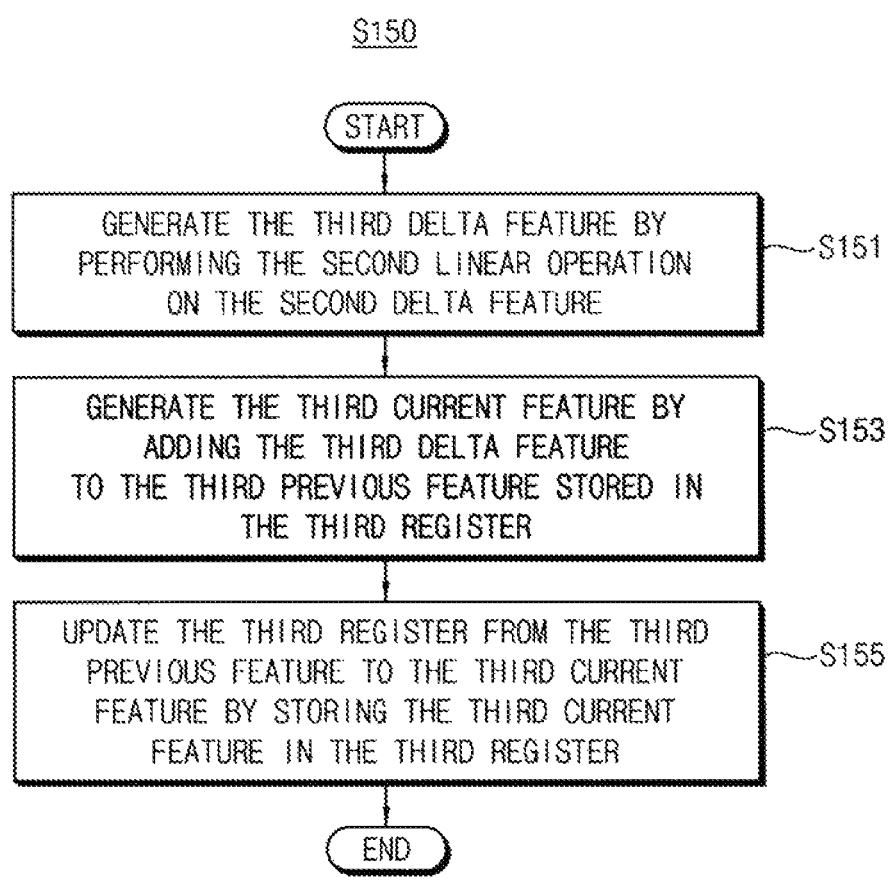
FIG. 7 is a flow chart illustrating an example of a process in which a second linear layer generates a third current feature of FIG. 2 according to exemplary embodiments of the inventive concept.

FIG. 7 is a flow chart illustrating an example of a process in which a second linear layer generates a third current feature of FIG. 2 according to an exemplary embodiment of the inventive concept. The operations illustrated in the flow chart of FIG. 7 correspond to operation S150 in the flow chart of FIG. 2 according to an exemplary embodiment of the inventive concept.

Referring to FIG. 7, the second linear layer 400 may generate the third delta feature D3_F(t) by performing the second linear operation on the second delta feature D2_F(t), which is received from the first nonlinear layer 300 (operation S151).

In exemplary embodiments, the second linear layer 400 may correspond to a fully connected layer of a neural network. In this case, the second linear operation may include a matrix multiplication operation using a matrix corresponding to the second weight. Therefore, each of the values of the third delta feature D3_(t), which is generated by performing the second linear operation on the second delta feature D2_F(t), may be related with all values of the second delta feature D2_F(t).

Figure 8:
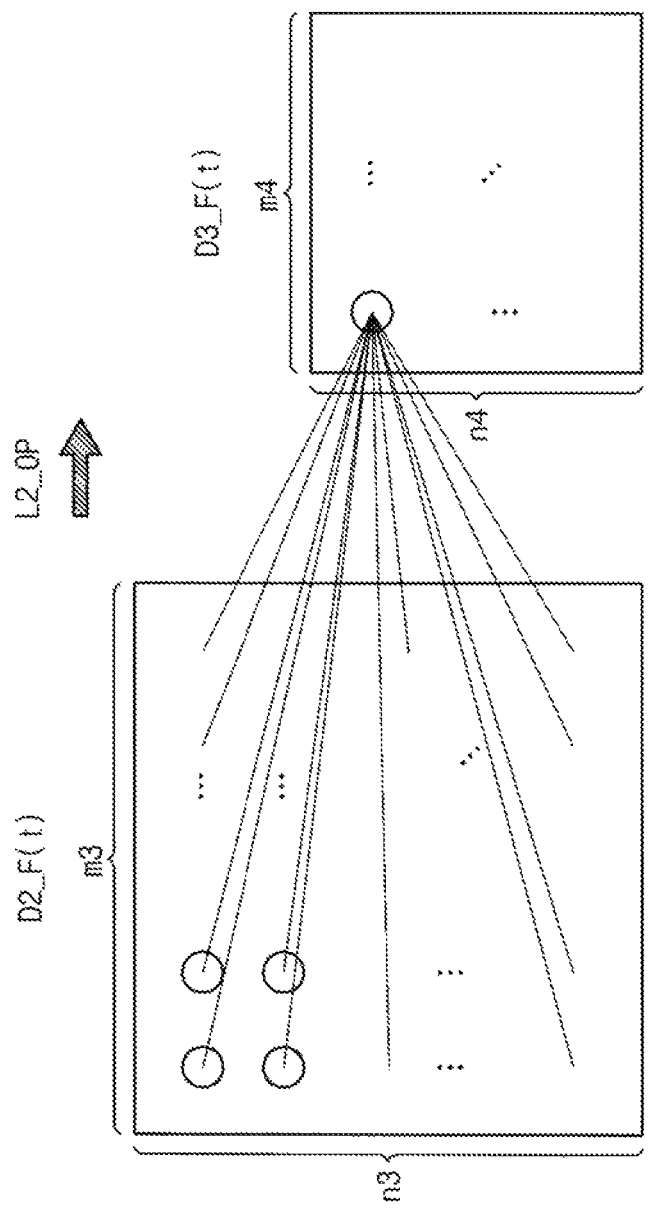
FIG. 8 is a diagram illustrating an example of a process in which the second linear layer generates a third delta feature by performing a second linear operation on a second delta feature of FIG. 7 according to exemplary embodiments of the inventive concept.

FIG. 8 is a diagram illustrating an example of a process in which the second linear layer generates a third delta feature by performing a second linear operation on a second delta feature of FIG. 7 according to an exemplary embodiment of the inventive concept.

In FIG. 8, the second delta feature D2_F(t) has (n3×m3) values, and the third delta feature D3_F(t) has (n4×m4) values as an example. Here, each of n4 and m4 represents a positive integer.

As illustrated in FIG. 8, the second linear layer 400 may perform the second linear operation L2_OP on the second delta feature D2_F(t) by performing a matrix multiplication operation on all values of the second delta feature D2_F(t) and the matrix corresponding to the second weight to generate each of the values of the third delta feature D3_F(t). Therefore, each of the values of the third delta feature D3_F(t), which is generated by performing the second linear operation L2_OP on the second delta feature D2_F(t), may be related with all values of the second delta feature D2_F(t).

However, it is to be understood that the second linear operation L2_OP illustrated in FIG. 8 is exemplary, and that the inventive concept is not limited thereto. For example, according to exemplary embodiments, the second linear operation L2_OP may include any linear operations (e.g., linear operations other than the linear operation L2_OP illustrated in FIG. 8).

Referring again to FIG. 7, since the second linear operation L2_OP includes an addition and a multiplication operation performed on values of the second delta feature D2_F(t) and the matrix corresponding to the second weight, the second linear operation L2_OP may satisfy a commutative law, a distributive law, and an associative law.

Therefore, as represented in [Equation 5], the third current feature C3_F(t), which corresponds to a result of performing the second linear operation L2_OP on the second current feature C2_F(t), may be represented as a sum of the third previous feature P3_F(t−1), which is stored in the third register 410 of the second linear layer 400 and corresponds to a result of performing the second linear operation L2_OP on the second previous feature P2_F(t−1), and the third delta feature D3_F(t), which is generated by performing the second linear operation L2_OP on the second delta feature D2_F(t):

$$C3\_F(t) = C2\_F(t) \times M2 \quad\quad [\text{Equation 5}]$$
$$= (P2\_F(t-1) + D2\_F(t)) \times M2$$
$$= P2\_F(t-1) \times M2 + D2\_F(t) \times M2$$
$$= P3\_F(t-1) + D3\_F(t)$$

Here, x represents the second linear operation L2_OP, and M2 represents the matrix corresponding to the second weight.

Therefore, the second linear layer 400 may generate the third current feature C3_F(t) by adding the third delta feature D3_F(t) to the third previous feature P3_F(t−1), which is stored in the third register 410 of the second linear layer 400 (operation S153).

In addition, the second linear layer 400 may update the third register 410 from the third previous feature P3_F(t−1) to the third current feature C3_F(t) by storing the third current feature C3_F(t) in the third register 410 (operation S155). For example, the second linear layer 400 may update the third register 410 by replacing the third previous feature P3_F(t−1) with the third current feature C3_F(t).

As described above with reference to FIGS. 7 and 8, in exemplary embodiments, the second linear layer 400 does not generate the third current feature C3_F(t) by directly performing the second linear operation L2_OP on the second current feature C2_F(t). Instead, in exemplary embodiments, the second linear layer 400 generates the third current feature C3_F(t) in a recursive manner, in which the second linear layer 400 generates the third delta feature D3_F(t) by performing the second linear operation L2_OP on the second delta feature D2_F(t) and then adding the third delta feature D3_F(t) to the third previous feature P3_F(t−1).

As described above, when the plurality of input data IDATA corresponds to a plurality of frame data included in a video stream, most of the values included in the second delta feature D2_F(t), which corresponds to a difference between the second current feature C2_F(t) and the second previous feature P2_F(t−1), may be 0. As a result, the second linear layer 400 may perform the second linear operation L2_OP on the second delta feature D2_F(t) at a high speed. Therefore, the second linear layer 400 may generate the third current feature C3_F(t), which corresponds to a result of performing the second linear operation L2_OP on the second current feature C2_F(t), at a high speed.

The second linear layer 400 may provide only the third current feature C3_F(t) to the output layer 700.

As described above, since the third current feature C3_F(t) corresponds to a result of consecutively performing the first linear operation L1_OP, the first nonlinear operation NL1_OP, and the second linear operation L2_OP on the current input data IDATA(t), the third current feature C3_F(t) may implicitly include information included in the current input data IDATA(t).

Therefore, referring again to FIG. 2, the output layer 700 may recognize the information included in the current input data IDATA(t) using the third current feature C3_F(t), which is received from the second linear layer 400, and generate the recognition signal REC corresponding to the recognized information (operation S180).

In exemplary embodiments, the plurality of input data IDATA may correspond to a plurality of frame data included in a video stream. In this case, the output layer 700 may recognize an object included in a frame data corresponding to the current input data IDATA(t) using the third current feature C3_F(t), which is received from the second linear layer 400, and generate the recognition signal REC corresponding to the recognized object.

As described above with reference to FIGS. 1 to 8, the neural network device 10 according to exemplary embodiments may perform linear operations at a high speed utilizing a high degree of similarity between consecutive input data IDATA, such that an operation speed of the neural network device 10 may be increased. Therefore, the neural network device 10 according to exemplary embodiments may be capable of rapidly recognizing information included in the plurality of input data IDATA, even when the plurality of input data IDATA is provided at a high speed.

In addition, the neural network device 10 according to exemplary embodiments may decrease the amount of operations performed by the first linear layer 200 and the second linear layer 400. Therefore, power consumption of the neural network device 10 may be decreased.

Figure 9:
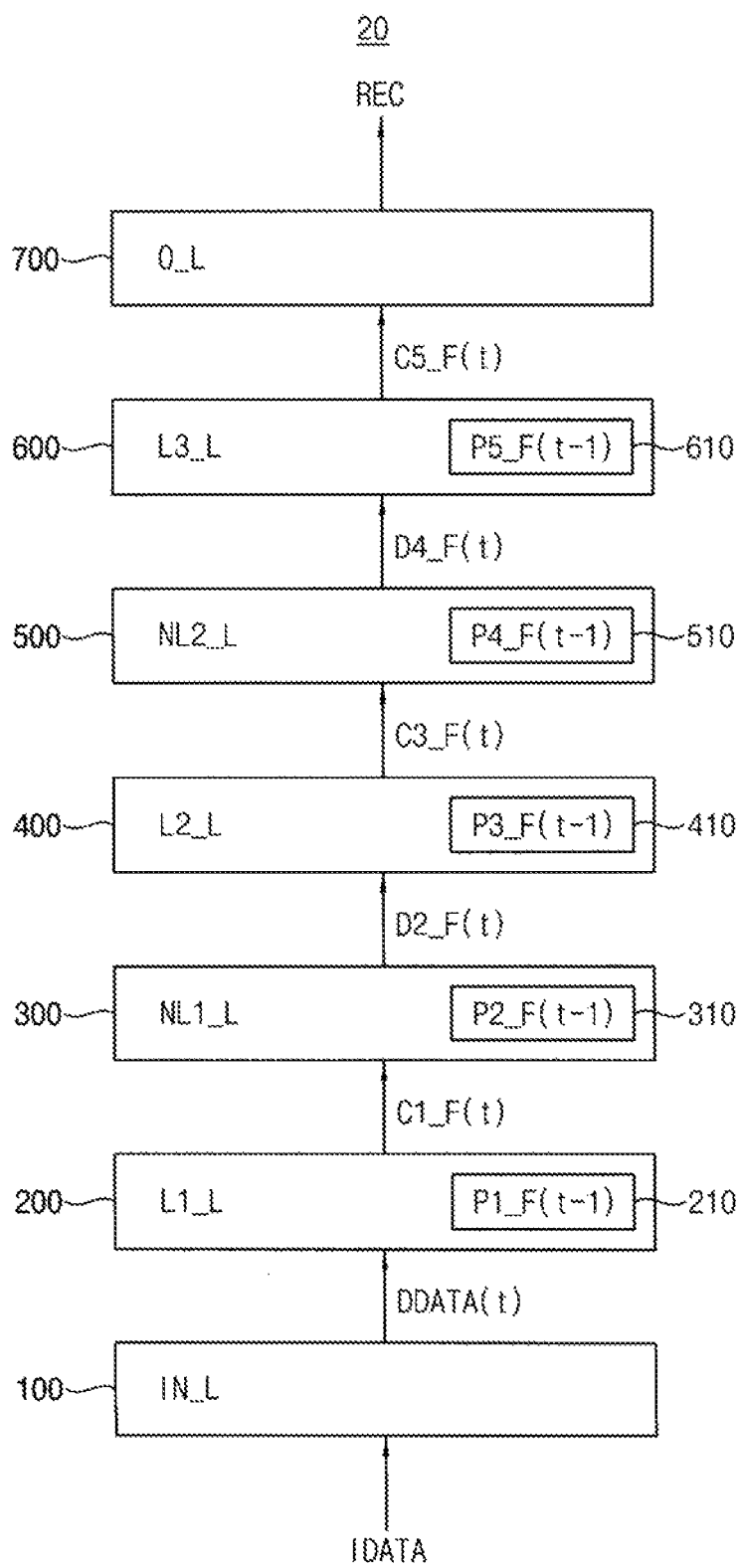
FIG. 9 is a block diagram illustrating a neural network device according to exemplary embodiments of the inventive concept.

FIG. 9 is a block diagram illustrating a neural network device according to exemplary embodiments of the inventive concept.

Referring to FIG. 9, a neural network device 20 includes an input layer IN_L 100, a first linear layer L1_L 200, a first nonlinear layer NL1_L 300, a second linear layer L2_L 400, a second nonlinear layer NL2_L 500, a third linear layer L3_L 600, and an output layer O_L 700. The input layer IN_L 100, the first linear layer L1_L 200, the first nonlinear layer NL1_L 300, the second linear layer L2_L 400, the second nonlinear layer NL2_L 500, the third linear layer L3_L 600, and the output layer O_L 700 may be sequentially connected to one another in the order shown in FIG. 9.

Figure 10:
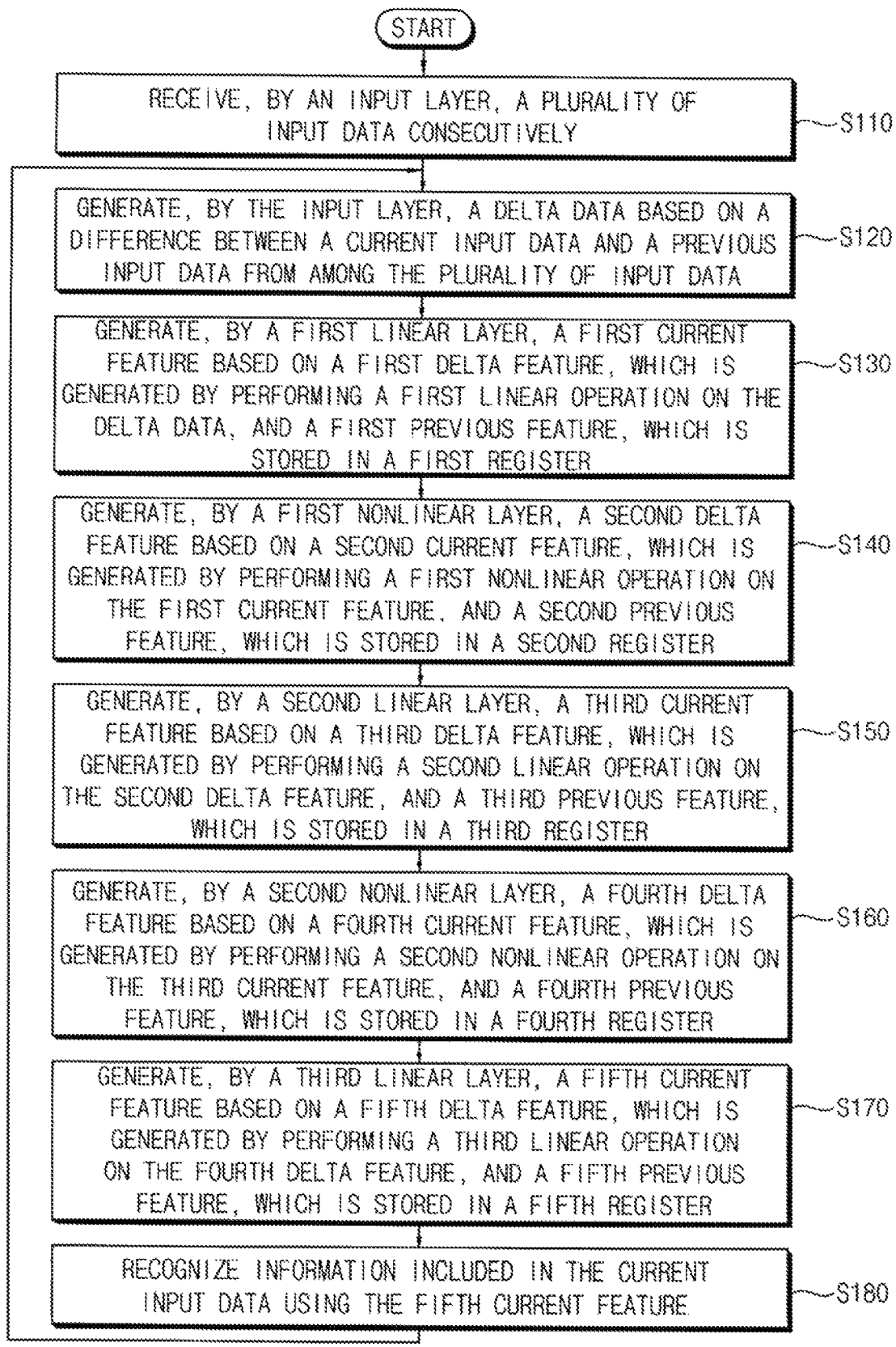
FIG. 10 is a flow chart illustrating a method of operating a neural network device according to exemplary embodiments of the inventive concept.

FIG. 10 is a flow chart illustrating a method of operating a neural network device according to exemplary embodiments of the inventive concept.

The method of operating a neural network device of FIG. 10 may be performed by the neural network device 20 of FIG. 9.

Compared to the neural network device 10 of FIG. 1, the neural network device 20 of FIG. 9 may further include the second nonlinear layer 500 and the third linear layer 600. According to exemplary embodiments, additional nonlinear and/or linear layers may further be included in the neural network device 20 of FIG. 9 or the neural network device 10 of FIG. 1.

The neural network device 20 of FIG. 9 may operate similarly to the neural network device 10 of FIG. 1 except that while, in an exemplary embodiment, the first linear layer 200 corresponds to a convolution layer of a neural network and the second linear layer 400 corresponds to a fully connected layer of a neural network in the neural network device 10 of FIG. 1, in the neural network device 20 of FIG. 9, in an exemplary embodiment, the first linear layer 200 and the second linear layer 400 correspond to a convolution layer of a neural network, and the third linear layer 600 corresponds to a fully connected layer of a neural network.

Therefore, for convenience of explanation, operations of the second nonlinear layer 500 and the third linear layer 600 will be described herein with reference to FIGS. 9 and 10, and a further description of components and processes previously described may be omitted.

The second nonlinear layer 500 may generate a fourth current feature C4_F(t) by performing a second nonlinear operation on the third current feature C3_F(t), which is received from the second linear layer 400. The second nonlinear layer 500 may further generate a fourth delta feature D4_F(t) based on the fourth current feature C4_F(t) and a fourth previous feature P4_F(t−1), which is stored in a fourth register 510 of the second nonlinear layer 500 (operation S160).

Here, the fourth previous feature P4_F(t−1), which is stored in the fourth register 510 of the second nonlinear layer 500, may correspond to a result of performing the second nonlinear operation on a feature provided to the second nonlinear layer 500 from the second linear layer 400 during a previous cycle.

In exemplary embodiments, the second nonlinear layer 500 may correspond to one of an activation layer and a pooling layer of a neural network.

The second nonlinear layer 500 may generate the fourth delta feature D4_F(t) based on the third current feature C3_F(t) and the fourth previous feature P4_F(t−1), which is stored in the fourth register 510 of the second nonlinear layer 500, in a similar manner in which the first nonlinear layer 300 generates the second delta feature D2_F(t) based on the first current feature C1_F(t) and the second previous feature P2_F(t−1), which is stored in the second register 310 of the first nonlinear layer 300.

For convenience of explanation, since an operation of the first nonlinear layer 300 is described above with reference to FIGS. 5 and 6, a detailed description regarding the operation of the second nonlinear layer 500 will be omitted herein.

The third linear layer 600 may generate a fifth delta feature D5_F(t) by performing a third linear operation on the fourth delta feature D4_F(t), which is received from the second nonlinear layer 500. The third linear layer 600 may further generate a fifth current feature C5_F(t), which corresponds to a result of performing the third linear operation on the fourth current feature C4_F(t), based on the fifth delta feature D5_F(t) and a fifth previous feature P5_F(t−1), which is stored in a fifth register 610 of the third linear layer 600 (operation S170).

Here, the fifth previous feature P5_F(t−1), which is stored in a fifth register 610 of the third linear layer 600, may correspond to a result of performing the third linear operation on the fourth previous feature P4_F(t−1), which is stored in the fourth register 510 of the second nonlinear layer 500.

In exemplary embodiments, the third linear layer 600 may correspond to a fully connected layer of a neural network.

The third linear layer 600 may generate the fifth current feature C5_F(t) based on the fourth delta feature D4_F(t) and the fifth previous feature P5_F(t−1), which is stored in a fifth register 610 of the third linear layer 600, in a similar manner in which the second linear layer 400 generates the third current feature C3_F(t) based on the second delta feature D2_F(t) and the third previous feature P3_F(t−1), which is stored in the third register 410 of the second linear layer 400.

For convenience of explanation, since an operation of the second linear layer 400 is described above with reference to FIGS. 7 and 8, a detailed description regarding the operation of the third linear layer 600 will be omitted herein.

As described above, since the fifth current feature C5_F(t) corresponds to a result of consecutively performing the first linear operation L1_OP, the first nonlinear operation NL1_OP, the second linear operation L2_OP, the second nonlinear operation, and the third linear operation on the current input data IDATA(t), the fifth current feature C5_F(t) may implicitly include information included in the current input data IDATA(t).

Therefore, the output layer 700 may recognize the information included in the current input data IDATA(t) using the fifth current feature C5_F(t), which is received from the third linear layer 600, and generate the recognition signal REC corresponding to the recognized information (operation S180).

In exemplary embodiments, the plurality of input data IDATA may correspond to a plurality of frame data included in a video stream. In this case, the output layer 700 may recognize an object included in a frame data corresponding to the current input data IDATA(t) using the fifth current feature C5_F(t), which is received from the third linear layer 600, and generate the recognition signal REC corresponding to the recognized object.

A general neural network device according to a comparative example may perform a high number of operations on input data to extract useful information from the input data. It may be difficult to increase an operation speed of such a neural network device or to decrease the power consumption of such a neural network device. Thus, it may be difficult to extract useful information from input data that is provided at a high speed. In addition, when an electronic device, which operates using a battery, includes such a general neural network device, the neural network device may consume a large amount of power from the battery.

As described above with reference to FIGS. 1 to 10, the neural network devices 10 and 20 according to exemplary embodiments of the inventive concept may perform linear operations at a high speed by utilizing a high degree of similarity between consecutive input data IDATA, such that an operation speed of the neural network device 20 may be increased. Therefore, the neural network devices 10 and 20 according to exemplary embodiments may be capable of rapidly recognizing information included in the plurality of input data IDATA, even when the plurality of input data IDATA is provided at a high speed.

In addition, the neural network devices 10 and 20 according to exemplary embodiments may decrease the amount of operations performed by the first linear layer 200, the second linear layer 400, and the third linear layer 600. Therefore, power consumption of the neural network devices 10 and 20 may be decreased.

As described above, according to exemplary embodiments of the inventive concept, the neural network included in the neural network devices 10 and 20 may include a plurality of layers. For example, the neural network may include the input layer IN_L 100, the output layer O_L 700, and the linear and nonlinear layers disposed therebetween (these intermediate linear and nonlinear layers may be collectively referred to as a hidden layer). Each of the layers may include a plurality of nodes. The nodes may be connected to one another through connection lines having connection weights.

The various elements (including, for example, the layers and nodes) and methods described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. In exemplary embodiments, each of the nodes included in the layers may be embodied by a processing device.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

According to exemplary embodiments of the inventive concept, any or all of the units, structures, apparatuses and modules described herein (including, for example, the layers and nodes) may be implemented by one or more circuits or circuitry (e.g., hardware) specifically structured to carry out some or all of the operations described herein as being performed by any or all of the above-referenced units, structures, apparatuses and modules described herein (or an element thereof). According to exemplary embodiments, any or all of the above-referenced units, structures, apparatuses and modules described herein may include or be implemented by a memory and one or more processors executing computer-readable code (e.g., software) that is stored in the memory and includes instructions corresponding to some or all of the operations described herein as being performed by any or all of the above-referenced units, structures, apparatuses and modules described herein (or an element thereof). According to exemplary embodiments, any or all of the above-referenced units, structures, apparatuses and modules described herein may be implemented by, for example, a combination of the above-referenced hardware and processors executing computer-readable code.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of operating a neural network device, the method comprising:

receiving, by an input layer, a plurality of consecutive input data, wherein the neural network device comprises a neural network including the input layer, a first linear layer, a first nonlinear layer, and a second nonlinear layer;

generating, by the input layer, a delta data based on a difference between a current input data and a previous input data from among the plurality of consecutive input data;

generating, by the first linear layer, a first current feature, wherein the first current feature corresponds to a result of performing a first linear operation on the current input data based on a first delta feature and a first previous feature, the first delta feature is generated by performing the first linear operation on the delta data, and the first previous feature is stored in a first register in the first linear layer;

generating, by the first nonlinear layer, a second delta feature based on a second current feature and a second previous feature, wherein the second current feature is generated by performing a first nonlinear operation on the first current feature, and the second previous feature is stored in a second register in the first nonlinear layer; and generating, by the second linear layer, a third current feature based on a third delta feature and a third previous feature, wherein the third current feature corresponds to a result of performing a second linear operation on the second current feature, the third delta feature is generated by performing the second linear operation on the second delta feature, and the third previous feature is stored in a third register in the second linear layer.

2. The method of claim 1, wherein the input layer sets a first input data from among the plurality of consecutive input data as the delta data when the input layer receives the first input data as the current input data, wherein the input layer generates the delta data by subtracting the previous input data from the current input data when the input layer receives each of the plurality of consecutive input data after receiving the first input data, wherein the previous input data is received before the current input data.

3. The method of claim 1, wherein the input layer provides only the delta data to the first linear layer.

4. The method of claim 1, wherein generating, by the first linear layer, the first current feature, comprises:

generating the first delta feature by performing the first linear operation on the delta data;

generating the first current feature by adding the first delta feature to the first previous feature stored in the first register; and updating the first register from the first previous feature to the first current feature by storing the first current feature in the first register.

5. The method of claim 1, wherein the first previous feature stored in the first register corresponds to a result of performing the first linear operation on the previous input data.

6. The method of claim 1, wherein the first linear layer corresponds to a convolution layer of the neural network.

7. The method of claim 1, wherein the first linear layer provides only the first current feature to the first nonlinear layer.

8. The method of claim 1, wherein generating, by the first nonlinear layer, the second delta feature comprises:

generating the second current feature by performing the first nonlinear operation on the first current feature;

generating the second delta feature by subtracting the second previous feature stored in the second register from the second current feature; and updating the second register from the second previous feature to the second current feature by storing the second current feature in the second register.

9. The method of claim 1, wherein the second previous feature stored in the second register corresponds to a result of performing the first nonlinear operation on a feature provided to the first nonlinear layer from the first linear layer during a previous cycle.

10. The method of claim 1, wherein the first nonlinear layer corresponds to one of an activation layer and a pooling layer of the neural network.

11. The method of claim 1, wherein the first nonlinear layer provides only the second delta feature to the second linear layer.

12. The method of claim 1, wherein generating, by the second linear layer, the third current feature comprises:

generating the third delta feature by performing the second linear operation on the second delta feature;

generating the third current feature by adding the third delta feature to the third previous feature stored in the third register; and updating the third register from the third previous feature to the third current feature by storing the third current feature in the third register.

13. The method of claim 1, wherein the third previous feature stored in the third register corresponds to a result of performing the second linear operation on the second previous feature stored in the second register of the first nonlinear layer.

14. The method of claim 1, wherein the second linear layer corresponds to a fully connected layer of the neural network.

15. The method of claim 1, further comprising:
recognizing information included in the current input data using the third current feature.

16. The method of claim 1, wherein the plurality of consecutive input data corresponds to a plurality of frame data included in a video stream.

17. The method of claim 16, further comprising:
recognizing an object included in a frame data corresponding to the current input data using the third current feature.

18. A neural network device, comprising:
an input layer of a neural network configured to receive a plurality of consecutive input data, and generate a delta data based on a difference between a current input data and a previous input data from among the plurality of consecutive input data;

a first linear layer of the neural network configured to generate a first delta feature by performing a first linear operation on the delta data, and generate a first current feature based on the first delta feature and a first previous feature, wherein the first current feature corresponds to a result of performing the first linear operation on the current input data, and the first previous feature is stored in a first register of the first linear layer;

a first nonlinear layer of the neural network configured to generate a second current feature by performing a first nonlinear operation on the first current feature, and generate a second delta feature based on the second current feature and a second previous feature, wherein the second previous feature is stored in a second register of the first nonlinear layer; and a second linear layer of the neural network configured to generate a third delta feature by performing a second linear operation on the second delta feature, and generate a third current feature based on the third delta feature and a third previous feature, wherein the third current feature corresponds to a result of performing the second linear operation on the second current feature, and the third previous feature is stored in a third register of the second linear layer.

19. The neural network device of claim 18, wherein the plurality of consecutive input data corresponds to a plurality of frame data included in a video stream.

20. A method of recognizing an object in a video stream, comprising:

receiving a plurality of consecutive data frames included in the video stream using an input layer of a neural network;

generating a delta data based on a difference between a current data frame and a previous data frame from among the plurality of consecutive data frames using the input layer of the neural network;

generating a first current feature using a first linear layer of the neural network, wherein the first current feature corresponds to a result of performing a first linear operation on the current data frame based on a first delta feature and a first previous feature, the first delta feature is generated by performing the first linear operation on the delta data, and the first previous feature is stored in a first register in the first linear layer;

generating a second delta feature based on a second current feature and a second previous feature using a first nonlinear layer of the neural network, wherein the second current feature is generated by performing a first nonlinear operation on the first current feature, and the second previous feature is stored in a second register in the first nonlinear layer;

generating a third current feature based on a third delta feature and a third previous feature using a second linear layer of the neural network, wherein the third current feature corresponds to a result of performing a second linear operation on the second current feature, the third delta feature is generated by performing the second linear operation on the second delta feature, and the third previous feature is stored in a third register in the second linear layer; and recognizing the object in the video stream using the third current feature.

* * * * *